Patented Jan. 7, 1936

2,026,637

UNITED STATES PATENT OFFICE 2,026,637

PROCESS FOR PRODUCING PIGMENTS OF THE INDANTHRONE SERIES

Frank Willard Johnson, Pennsgrove, N. J., assignor to E. I. du Pont de Nemours & Company, Wilmington, Del., a corporation of Delaware No Drawing. Application December 20, 1932, Serial No. 648,139

10 Claims. (Cl. 260—31)

This invention relates to vat colors of the indanthrone series, more particularly N-dihydro-1,2,2',1'-anthraquinone-azines, and a process for producing such substances in a form especially suitable for use in dyeing cloth by the "pigment pad-jig reduction" method, for printing, for use as pigments, and for many other purposes.

In dyeing by the "pigment pad-jig reduction" method, the materials to be dyed are usually passed through a thin suspension of the dye in pigment form (that is, without vatting). The resultant materials are then normally passed through a bath containing sodium hydroxide or other alkaline reacting substance and a reducing agent, usually sodium hydrosulfite, at a suitable temperature. The materials are passed back and forth through the reducing bath as often as is necessary to completely vat and fix the dye to the fiber. Obviously, it is economically of great importance that the dye in the original paste be in such a physical condition that it will cover the cloth well in the pigment form and then be readily and rapidly vatted under the conditions used in this process so that a minimum number of passages through the reducing bath are necessary. A reduction in the number of passages of the material through the reducing bath not only reduces the cost of dyeing considerably, but results in more level and brighter dyeings of greater fastness.

In printing, it is also desirable for the dye to be in such a physical form that maximum covering power and a high rate of reduction are obtained so that a large proportion of the dye will be vatted under the conditions of aging.

According to the usual methods of preparation, many dyes of the indanthrone series leave much to be desired in their commercial application. Thus, when a chloro-N-dihydro-1,2,2',1'-anthraquinone azine is prepared by chlorinating N-dihydro-1,2,2',1'-anthraquinone azine in sulfuric acid solution by means of chlorine gas, drowning the solution in water, filtering and making the acid-free filter cake into a dye paste in the usual manner, the dye is found to be in a rather coarse state of sub-division and the particles are very dense. In this form the dye shows a very slow rate of reduction and, for this reason, is unsuitable for printing or for dyeing by the "pigment pad-jig reduction" method.

It is an object of the present invention to produce dyes of the indanthrone series in a new form. A further object is the production of dyes of the indanthrone series in a highly dispersed physical state and easily reducible to the leuco form. Another object is the production of N-dihydro-1,2,2',1'-anthraquinone azines which are especially valuable for dyeing cloth by the "pigment pad-jig reduction" process, for printing, for use as a pigment, and for many other purposes. A further object of my invention is to produce halogenated N-dihydro-1,2,2',1'-anthraquinone-azine in substantially pure form, free of the azine and azhydrine forms of the dyestuff. Other objects will appear hereinafter.

These objects are accomplished according to the invention by treating vat colors of the indanthrone series in a solvent medium with a soluble cyclo-aliphatic compound. This is preferably effected by dissolving the vat color in sulfuric acid, adding the soluble cyclo-aliphatic compound, and recovering the desired product in any suitable manner, e. g., by drowning the solution in water, filtering and washing the solid residue acid-free. The product is obtained in an extremely finely divided form in excellent condition for use as a pigment and shows a remarkably high rate of reduction.

While the invention is susceptible to considerable variation and modification in the manner of its practical application, particularly as regards the kind and proportions of materials, the conditions and exact method of procedure, the following examples, in which the parts are by weight, will serve to illustrate how the invention may be practiced.

Example I

About 500 parts of substantially pure N-dihydro-1,2,2',1'-anthraquinone azine were dissolved in 4000 parts of sulfuric acid of a strength between 96% and 99%, contained in a cast iron vessel capable of withstanding a working pressure of 150 pounds per square inch. The vessel was closed and through a valve there were added about 250 parts of chlorine gas, whereby a pressure of 125 to 150 pounds per square inch developed. The reaction mass was allowed to agitate at 25° C. to 30° C. until a test portion showed a chlorine content of 13% to 14% chlorine. During the operation the pressure gradually dropped, being about 75 pounds per square inch at the end. When the desired chlorine content was attained, air was passed through the acid solution to blow out any excess chlorine and about 5.0 parts of cyclohexanol slowly run into the charge. The product was heated for 30 minutes at about 60° C. to 65° C. The solution was then drowned in water, filtered, washed and made into a paste in the usual manner by milling with a dispersing agent. The paste was a pure blue product, which indicates substantial freedom from the azine or azhydrine forms of the dyestuff. The dye was highly dispersed and showed a remarkably high rate of vatting. The dye was a dichloro-N-dihydro-1,2,2',1'-anthraquinone azine, most probably 3,3'-dichloro-N-dihydro-1,2,2'1'-anthraquinone azine in a new physical state.

Example II

A solution of 500 parts of N-dihydro-1,2,2',1'-anthraquinone azine in 4000 parts of 94% to 96% sulfuric acid was charged into an autoclave maintained at a temperature of about 25° C. to 30° C., and 100 parts of dry sodium chloride were added through a hopper provided for that purpose. The hydrogen chloride generated by the sodium chloride and sulfuric acid produced a pressure of about 40 to 50 pounds per square inch. The charge was agitated for two hours. Sufficient chlorine was then added from a storage cylinder during a period of about 15 to 30 minutes to increase the total pressure to about 100 to 125 pounds per square inch. The product was then agitated at a temperature of about 25° C. to 30° C. until a test sample showed that a chlorine content of about 5% to 7% had been obtained.

Air was then passed through the acid solution to blow out any excess chlorine, and about 5.0 parts of cyclohexanol were slowly added to the charge. The product was heated for about 30 minutes at 50° C. The solution was then discharged into a tank containing about 8000 to 9000 parts of water. The resultant mixture was diluted to 16,000 to 18,000 parts with water, and the precipitated dye was separated by filtering and washing. The dye was obtained in a finely divided, substantially crystalline form and yielded dyeings and printings of excellent qualities.

Example III

Ten parts of dry Ponsol Blue GD ("Colour Index" No. 1113, Schultz No. 767) were dissolved in 80 parts of concentrated sulfuric acid. Five-tenths part of cyclohexanol was added and the temperature gradually raised to and maintained at about 50° C. for about 30 minutes. The product was drowned in water and worked up as in Example I.

The treatment with a cyclo-aliphatic compound as described in the examples may be applied to any other vat colors of the indanthrone series, leading to the production of products of improved properties and of greatly increased commercial value. Particularly desirable results have been obtained in the treatment of chloro indanthrones containing less than about 15% chlorine and being either in the azine, azhydrine, or dihydro-azine form, or as mixtures thereof. Other dihydro-azines, azines or azhydrines of the indanthrone series, for example, those containing substituent groups or atoms such as bromine, fluorine, methyl, ethyl, propyl, butyl, isobutyl, methoxy, ethoxy, phenyl, benzyl, benzoyl, benzoylamino and the like, may be similarly treated with desirable results.

The use of a solvent medium such as sulfuric acid for dissolving vat colors is well known. In general, it is desirable to use a concentrated sulfuric acid, preferably having a concentration of about 90% to 100%. If desired, weak oleum, or any other solvent medium which is unreactive or inert, may be employed.

The cyclo-aliphatic compound employed in accordance with the invention may be any cyclo-aliphatic compound which is soluble in the solution of the vat color. It will be understood that all cyclo-aliphatic compounds are not equivalents for this purpose, since the results obtained are better with some compounds than with others. Particularly desirable results have been obtained by the use of hydroaromatic compounds of the benzene or naphthalene series, such as cyclohexanol, cyclohexanone, tetra-hydro-napthalene, deca-hydro-naphthalene, methyl cyclohexanol, 1-cyclohexyl-2-ethoxy-benzene and the like.

The amount of the cyclo-aliphatic compound may be varied within relatively wide limits. Good results have been obtained in the use of about 0.05 to about 0.5 mole of cyclo-aliphatic compound per mole of vat color.

The temperature employed in the treatment with the cyclo-aliphatic compound may be varied widely. The treatment may be effected at room temperature or at higher temperatures. Good results have been obtained employing the temperature conditions given in the examples. In general, it is desirable to regulate the temperature to avoid side reactions, such as, for example, sulfonation.

The products of the invention have superior properties of covering power and are characterized by an unusually fine state of sub-division, good uniformity and exceptional ease of reduction to the leuco form. They may be used as such, or in combination with suitable dispersing agents, or with other materials according to the practice in the dye industry. On account of their improved properties, they are well adapted to dyeing by the "pigment pad-jig reduction" method since, in the unreduced state, they cover the cloth well and are readily vatted by passage through the reducing bath. The cost of dyeing by this method is thereby reduced and the dyeings are more level, brighter and possess greater fastness than heretofore. In printing, the dyes of the present invention are more readily vatted than the untreated dyes and, therefore, yield more even prints of greater fastness. Furthermore, the fine state of sub-division and great covering power of these dyes make them particularly desirable for use as pigments, e. g., in rubber.

As many apparently widely different embodiments of this invention may be made without departing from the spirit and scope thereof, it is to be understood that I do not limit myself to the specific embodiments thereof except as defined in the following claims.

I claim:

1. In a process of producing vat colors of the indanthrone series, the step which comprises treating a sulfuric acid solution of a compound of the indanthrone series with a soluble cyclo-aliphatic compound under such temperature conditions that the sulfuric acid is substantially inert.

2. In a process of producing vat colors of the indanthrone series, the step which comprises treating a sulfuric acid solution of a mixture of the dihydroazine with the azine or azhydrine of a vat color of the indanthrone series with a soluble cyclo-aliphatic compound under such temperature conditions that the sulfuric acid is substantially inert.

3. In a process of producing N-dihydro-1,2,2',1'-anthraquinone azines, the step which comprises treating a sulfuric acid solution containing an oxidized form of an N-dihydro-1,2,2',1'-anthraquinone azine with cyclohexanol under such temperature conditions that the sulfuric acid is substantially inert.

4. In a process of producing a chloro-N-dihydro-1,2,2',1'-anthraquinone azine, the steps which comprise chlorinating N-dihydro-1,2,2',1'-anthraquinone azine in sulfuric acid solution, adding cyclohexanol to the solution under such temperature conditions that the sulfuric acid is substantially inert, drowning the resultant solution in water, and recovering the solid product.

5. The process of producing a dichloro-N-dihydro-1,2,2',1'-anthraquinone azine in a new physical state which comprises chlorinating a furic acid solution of N-dihydro-1,2,2',1'-anthraquinone azine until the chlorine content is about 14% by weight, adding cyclohexanol to the solution under such temperature conditions that the sulfuric acid is substantially inert, drowning the resultant solution in water, and recovering the solid product.

6. In a process of producing vat colors of the indanthrone series, the step which comprises treating a sulfuric acid solution of the crude color containing both the dihydrozine form and the higher oxidation forms of the dyestuff with cyclohexanol under such temperature conditions that the sulfuric acid is substantially inert.

7. In a process of producing a chloro-N-dihydro-1,2,2',1'-anthraquinone azine, the steps which comprise chlorinating N-dihydro-1,2,2',1'-anthraquinone azine in sulfuric acid solution, adding a soluble cycloaliphatic compound to said solution while maintaining such temperature conditions that the sulfuric acid is substantially inert, and precipitating the water-insoluble color.

8. In a process of producing a chloro-N-dihydro-1,2,2',1'-anthraquinone azine, the steps which comprise chlorinating N-dihydro-1,2,2',1'-anthraquinone azine in sulfuric acid solution, adding cyclohexanol to the solution while maintaining such temperature conditions that the sulfuric acid is substantially inert, and precipitating the water-insoluble color.

9. In a process for producing a vat dyestuff of the indanthrone series, which involves as a final step precipitation of the dyestuff from a sulfuric acid solution thereof, the improvement which comprises agitating the mass prior to precipitation with a compound selected from the group consisting of cyclohexanol, cyclohexanone, tetrahydronaphthalene, methyl-cyclohexanol, and 1-cyclohexyl-2-ethoxy-benzene, at a temperature not above 65° C., until the mass is substantially free from the azine and azhydrine forms of the dyestuff.

10. A process as in claim 9, the amount of the hydroaromatic compound being between 0.05 and 0.5 mole per mole of the dyestuff.

FRANK WILLARD JOHNSON.